United States Patent
Suito

(10) Patent No.: US 8,422,642 B2
(45) Date of Patent: Apr. 16, 2013

(54) MESSAGE SYSTEM FOR CONDUCTING MESSAGE

(75) Inventor: Akiko Suito, Tokyo (JP)

(73) Assignee: NEC Corporation, Tokyo (JP)

( * ) Notice: Subject to any disclaimer, the term of this patent is extended or adjusted under 35 U.S.C. 154(b) by 1633 days.

(21) Appl. No.: 11/844,961

(22) Filed: Aug. 24, 2007

(65) Prior Publication Data

US 2008/0056458 A1 Mar. 6, 2008

(30) Foreign Application Priority Data

Aug. 31, 2006 (JP) ................................. 2006-234949

(51) Int. Cl.
*H04M 1/64* (2006.01)
*H04M 3/42* (2006.01)

(52) U.S. Cl.
USPC .................. 379/88.11; 379/201.1; 379/209.01

(58) Field of Classification Search ....................... 379/88
See application file for complete search history.

(56) References Cited

U.S. PATENT DOCUMENTS

| | | | |
|---|---|---|---|
| 6,333,932 B1 * | 12/2001 | Kobayasi et al. ............. | 370/389 |
| 6,373,924 B2 * | 4/2002 | Tanaka et al. ............. | 379/22.01 |
| 6,731,609 B1 * | 5/2004 | Hirni et al. .................... | 370/260 |
| 7,136,462 B2 * | 11/2006 | Pelaez et al. ............... | 379/88.14 |
| 7,139,718 B2 * | 11/2006 | Jeyachandran et al. ...... | 705/7.21 |
| 7,474,741 B2 * | 1/2009 | Brunson et al. ............ | 379/88.17 |
| 7,505,777 B2 * | 3/2009 | Kim ............................... | 455/466 |
| 8,027,835 B2 * | 9/2011 | Aizawa ......................... | 704/258 |
| 8,059,793 B2 * | 11/2011 | Shaffer et al. .............. | 379/88.13 |
| 8,130,919 B2 * | 3/2012 | Kalbag ........................ | 379/88.22 |
| 8,139,726 B1 * | 3/2012 | Zetterberg ................. | 379/88.14 |
| 8,150,689 B2 * | 4/2012 | Beach et al. .................. | 704/235 |
| 2011/0269439 A1 * | 11/2011 | Griffin ........................... | 455/415 |

FOREIGN PATENT DOCUMENTS

| | | |
|---|---|---|
| JP | 04-294655 A | 10/1992 |
| JP | 09-008842 A | 1/1997 |
| JP | 09-055791 A | 2/1997 |
| JP | 2001-036647 A | 2/2001 |
| JP | 2002-149561 A | 5/2002 |
| JP | 2003-18332 A | 1/2003 |
| JP | 2005-228125 A | 8/2005 |

* cited by examiner

*Primary Examiner* — Joseph T Phan
(74) *Attorney, Agent, or Firm* — Sughrue Mion, PLLC

(57) ABSTRACT

A message system includes a first communication terminal, a second communication terminal and a communication circuit which connects the terminals. The first communication terminal displays a first message memo based on a first message data. The second communication terminal displays a second message memo based on a second message data which corresponds to the first message data. The second communication terminal makes a change of a second status of the second message data in response to an operation to the second message memo and transmits a change notice indicating the change. The second communication terminal updates the second message memo in response to the operation. The first communication terminal is configured to update the first message memo based on the change notice.

20 Claims, 12 Drawing Sheets

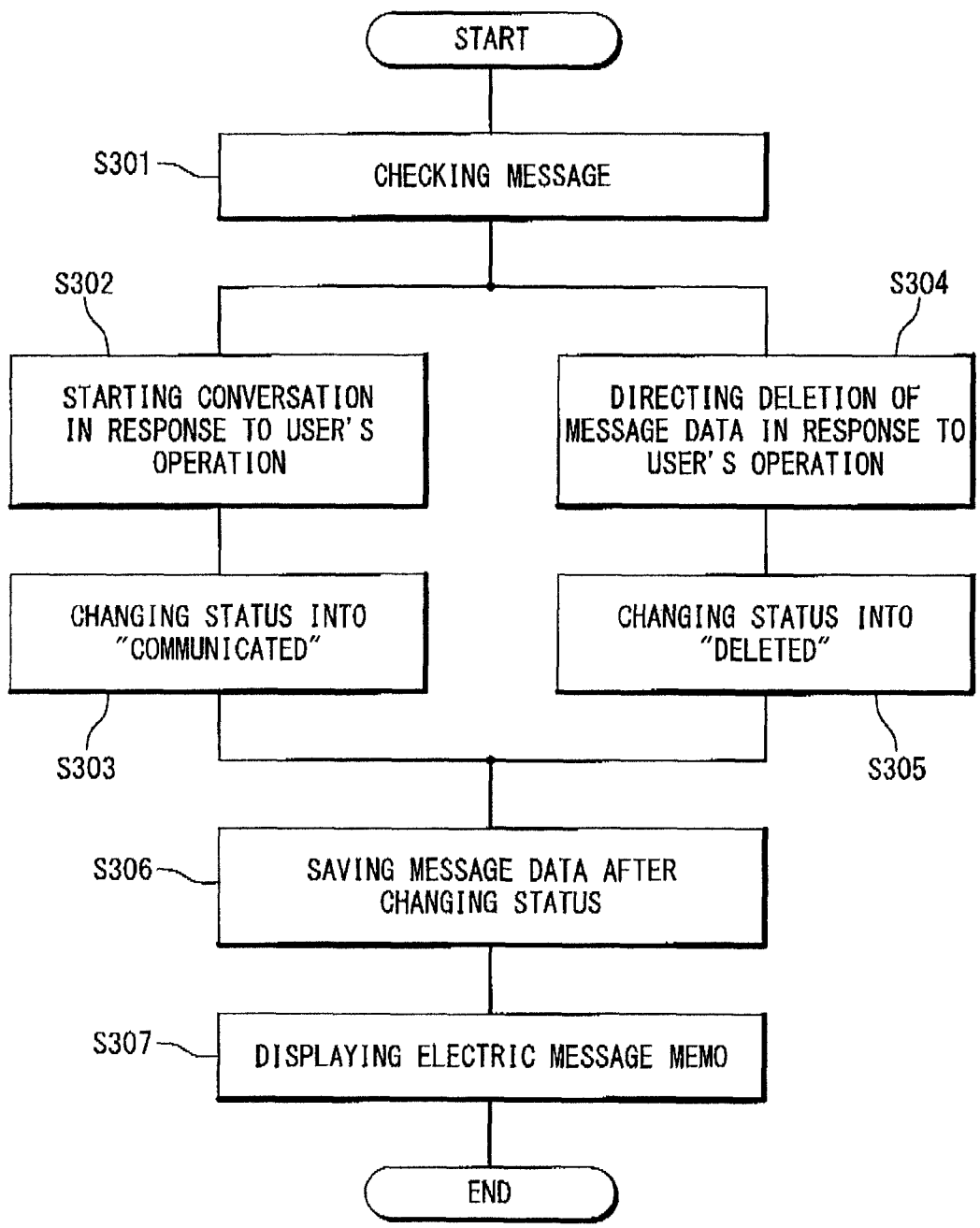

MESSAGE SYSTEM FOR CONDUCTING MESSAGE

BACKGROUND ART

1. Field of the Invention

The present invention relates to a message system.

2. Description of Related Art

In general telephone systems, when a person can not answer to an incoming call, a voice message is recorded and the person hears the recorded message later. In this case, a time given for a sender to speak the message is short and thus it is difficult to speak the message appropriately. It is difficult for the person as a receiver of the message to understand the message correctly with ease by listening to the message reproduced as sound. Moreover, the sender can not know whether the massage has been reproduced. This may be a problem when the sender wants to communicate with the receiver urgently.

In a related telephone system, a voice or characters are inputted to generate a message and the message is sent to a receiver. The receiver attempts to communicate with the sender of the message immediately after checking the massage. However, when the receiver fails to communicate with the sender at that time, the receiver often forgets to communicate since the message is buried with many logs of incoming calls. Meanwhile, the sender needs to wait until the receiver checks the message and returns a call.

As related art, Japanese Laid Open Patent Application (JP-P 2003-018332A) discloses a character message system, a terminal apparatus and a switchboard used for the system Japanese Laid Open Patent Application (JP-P 2003-018332A) discloses a method of sending a message as character information to a person who can not answer an incoming call. The message text is generated from characters inputted through operation of keys and the message text is displayed on a telephone of the person. Thus, the message can be understood by the person.

Japanese Laid Open Patent Application (JP-P 2005-228125A) discloses a client terminal, a service providing server, a service management server, a device control method, a recording medium, and a program. Japanese Laid Open Patent Application (JP-P 2005-228125A) discloses a method in which a reception of new information is mutually notified among a plurality of users. When information is updated through an operation by one of the users, the update data is sent to a server, each of the other users receives the update notice. Thus, each of the other users can know the operation in real time.

Considerations of the present inventor(s) will be described bellow.

Even in the message system of Japanese Laid Open Patent Application (JP-P 2003-018332A), the message may be buried with logs of incoming calls after the message is checked by the receiver of the message. It is inefficient to display a screen showing the logs of incoming calls continuously. It is unnecessary to display a log accompanying no message. Moreover, the sender of the message can not know whether the receiver has checked the message.

In Japanese Laid Open Patent Application (JP-P 2005-228125A), it is not considered how to display a plurality of messages shared with different users. Specifically, it is not considered to display the plurality of messages in a list. Moreover, a responding means for responding the message is not considered.

SUMMARY

An exemplary object of the present invention is to improve communication in a message system.

In an exemplary aspect of the present invention, a message system includes: a first communication terminal configured to display a first message memo based on a first message data; a second communication terminal configured to display a second message memo based on a second message data which corresponds to the first message data; and a communication circuit configured to connect the first communication terminal and the second communication terminal. The second communication terminal is configured to make a change of a second status of the second message data in response to an operation to the second message memo and transmit a change notice indicating the change. The second communication terminal is configured to update the second message memo in response to the operation. The first communication terminal is configured to update the first message memo based on the change notice.

In another exemplary aspect of the present invention, a message system includes: a message input section configured to use an input screen to generate a first message data which includes a data of a message, a receiver data and a status data; a message control section configured to transmit the first message data as a second message data to a communication terminal corresponding to the receiver data; a message management section configured to make a change of the status data such that the status data is changed from an unread state into a read state, upon receiving a change notice from the communication terminal which have disclosed the second message data, wherein the unread state indicates that the second message data has not been disclosed and the read state indicates that the second message data has been disclosed; and a message display section configured to display a message memo which shows the message. The message display section is configured to update the message memo in response to the change.

In another exemplary aspect of the present invention, a message system includes: a first communication terminal displaying a first message memo based on a first message data; a second communication terminal displaying a second message memo based on a second message data which corresponds to the first message data; and the first communication terminal updating the first message memo based on an operation to the first message memo or a change notice indicating that a second status of the second message has been changed.

In another exemplary aspect of the present invention, a message system controlling method includes: using an input screen to generate a first message data which includes a data of a message, a receiver data and a status data; displaying a message memo which shows the message; transmitting the first message data as a second message data to a communication terminal corresponding to the receiver data; making a change of the status data such that the status data is changed from an unread state into a read state, upon receiving a change notice from the communication terminal which have disclosed the second message data, wherein the unread state indicates that the second message data has not been disclosed and the read state indicates that the second message data has been disclosed; and updating the message memo in response to the change of the status.

In another exemplary aspect of the present invention, a computer program product for a method which includes: a first communication terminal displaying a first message memo based on a first message data; a second communication terminal displaying a second message memo based on a second message data which corresponds to the first message data; and the first communication terminal updating the first message memo based on an operation to the first message memo or a change notice indicating that a second status of the second message has been changed.

In another exemplary aspect of the present invention, a computer program product for a method which comprises: using an input screen to generate a first message data which includes a data of a message, a receiver data and a status data; displaying a message memo which shows the message; transmitting the first message data as a second message data to a communication terminal corresponding to the receiver data; making a change of the status data such that the status data is changed from an unread state into a read state, upon receiving a change notice from the communication terminal which have disclosed the second message data, wherein the unread state indicates that the second message data has not been disclosed and the read state indicates that the second message data has been disclosed; and updating the message memo in response to the change of the status.

BRIEF DESCRIPTION OF THE DRAWINGS

FIG. 12 is a flowchart of an operation concerning to an operation to a message memo.

DETAILED DESCRIPTION OF PREFERRED EMBODIMENTS

A first exemplary embodiment of the present invention will be described below with reference to the accompanying drawings.

Figure 1:
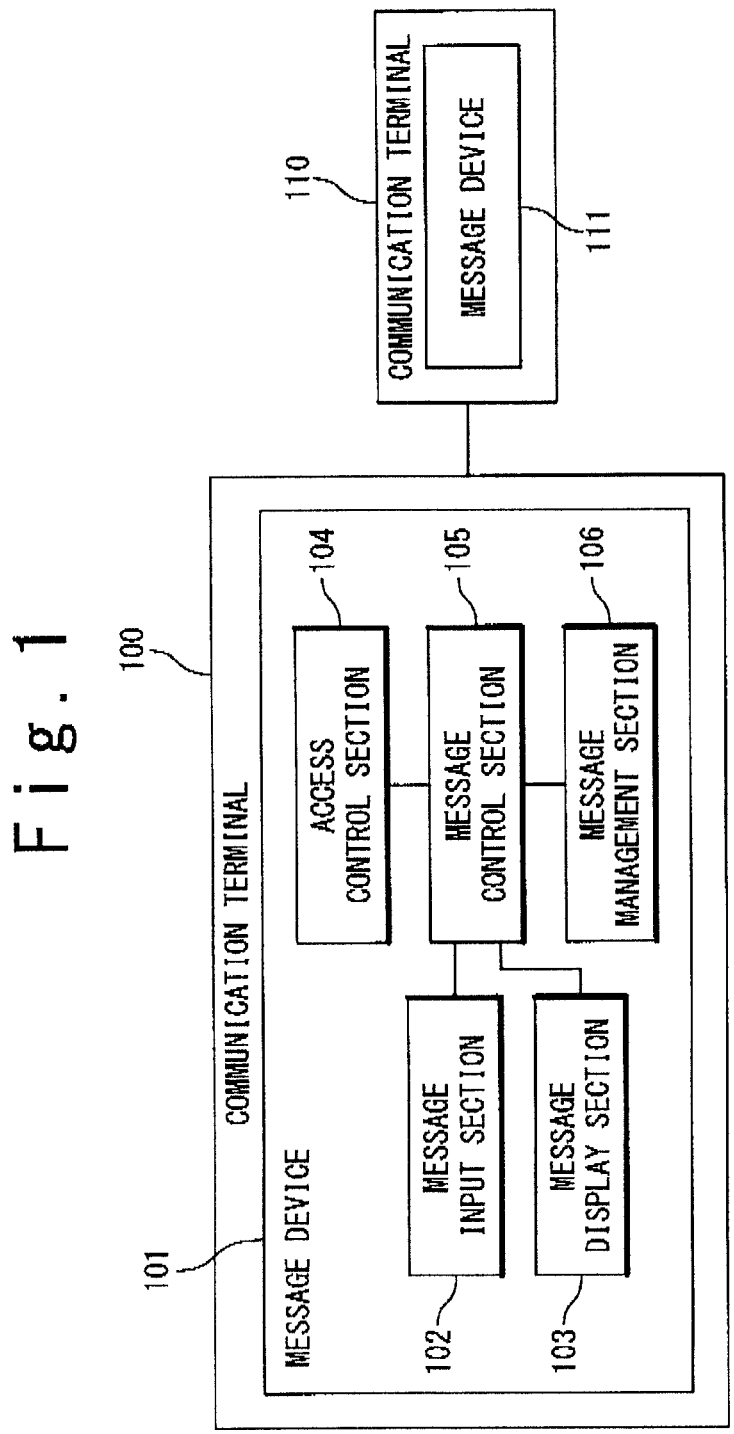
FIG. 1 is a block diagram showing a first system configuration of a message system according to a first exemplary embodiment of the present invention.

FIG. 1 is a block diagram showing a first system configuration of a message system according to the first exemplary embodiment. The message system includes a communication terminal 100 and a communication terminal 110. The communication terminal 100 is used by a sender of a message data. The communication terminal 110 is used by a receiver of the message data. Each of the communication terminals 100 and 110 is a terminal, such as personal computer (PC), portable telephone, home telephone, internet protocol (IP) telephone, portable game machine, home game machine, internet television or the like, and can be connected to a communication circuit. The communication terminals 100 and 110 are connected to each other via a network including one or more kinds of communication circuits. The message system may include one or more communication terminals in addition to the communication terminal 100 and the communication terminal 110. The communication circuit may be any of wired and wireless communication circuits.

The communication terminal 100 includes a message device 101. The message device 101 includes a message input section 102, a message display section 103, an access control section 104, a message control section 105, and a message management section 106. The message input section 102 inputs and processes a message for generating a message data. The message display section 103 displays a message memo based on the message data. Such message memo may be referred to as electric message memo, message note or electric message note. The access control section 104 accesses a function or a program (not shown) for communicating with the opposite party in response to an operation to the message memo. The message control section 105 exchanges data with the message input section 102, the message display section 103 and the access control section 104, and directs them to operate, while monitoring the status (state) of the message data. The message management section 106 updates and stores the message data.

The communication terminal 110 includes a message device 111 which includes sections same as those of the message device 101. Each of the communication terminals 100 and 110 includes a display as a display device.

The communication terminal 100 includes keyboard, pen, mouse, and microphone as input devices. The message input section 102 generates a data of message. Two examples of methods for easily generating the data of message will be described. In the first example, the sender speaks a message to the microphone, the message input section 102 generate the data of message as text data from the spoken message by using voice recognition. In the second example, the message input section 102 provides predetermined sentences, the sender selects some of the predetermined sentences by using the keyboard, the pen or the mouse, and the message input section 102 generates the data of message based on the selection.

The message management section 106 saves a message data, which includes the generated data of message, a date and time data, a receiver data, a status data and the like, in a disk or a memory device of the communication terminal. The date and time data indicates the date and time when the data of message is generated. The receiver data indicates the receiver of message or the communication terminal 110 used by the receiver. The receiver data may indicates other communication terminals in addition to the communication terminal 110. The status data indicates a state of newly generated.

The message control section 105 transmits the message data to the communication terminal 110. The message management section 106 saves the message data. When the communication terminal 110 is in an offline state, the message control section 105 postpones the transmission. The message system preferably includes a presence management terminal which manages connection states (online or offline) of the communication terminals of the message system. The message control section 105 receives a data indicating the connection state of the communication terminal 110 to detect the connection state of the communication terminal 110. The message data may include data files such as electric document file or voice file.

Figure 2:
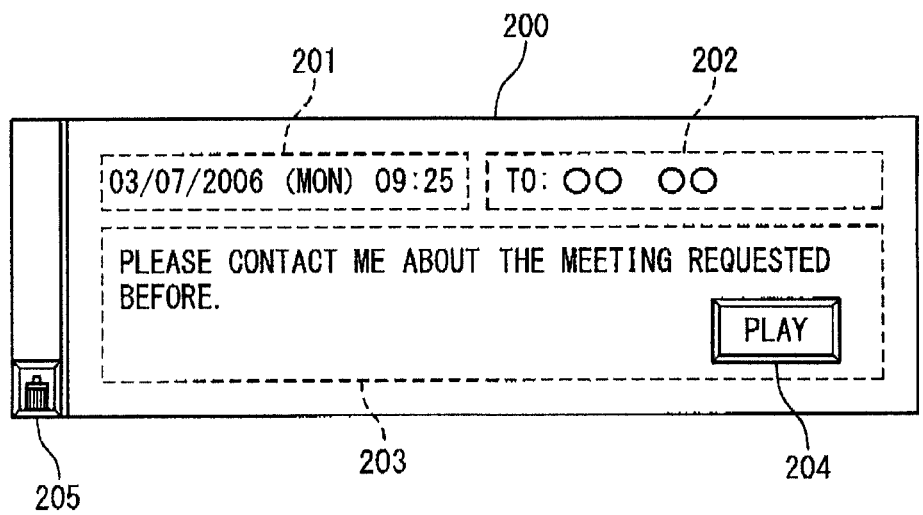
FIG. 2 shows an example of a message memo.

When the message data is generated, for example, the message display section 103 displays a message memo as shown in FIG. 2 on the display device. The message memo is displayed on a display area 200 of the display. As shown in FIG. 2, the display area 200 includes a date and time area 201, an opposite party area 202, a message area 203, a play button 204, and a delete button 205. The date and time area 201 shows the date and time of the transmission of the message data. The opposite party area 202 shows the receiver for the sender side and the sender for the receiver side. The opposite party area 202 may show both of the sender and the receiver. The message area 203 shows the message as text. When the play button 204 is operated by the user (sender or receiver), the message is reproduced as sound. When the delete button 205 is operated by the user, the corresponding message data is deleted.

The message memo may be displayed in a tag form as shown in FIG. 2, a rectangular form such as a card pinned on a bulletin board, a form representing a character or the like. The display device displays one or more message memos. The display device keeps displaying the message memo unless the user executes the operation for deletion or the message system executes a predetermined operation for deletion. The message memos may be displayed such that the message memos are arranged in a line or a matrix. When the number of the message memos increases to some extent, the message memos may be displayed in an overlapped manner in which the message memo are shifted slightly from one another. Further, the message memos may be displayed one after another.

When the message data of an unread state is disclosed, the message device 111 notifies the communication terminal 100 to change the status of the corresponding message data into a read state. Upon receiving the notice, the message management section 106 of the communication terminal 100 changes the status of the corresponding message data into the read state and the message display section 103 of the communication terminal 100 updates the message memo such that the read state is recognized visually. For example, the display section 103 changes a background color of the message memo, a transparency of the message memo, a background image of the message memo, an icon image in the message memo, a frame of message memo or a size of the message memo. The status can designate a plurality of states including a state of deletion of the message memo.

The message data preferably includes a data which indicates responding means such as telephone or message communication. In this case, the access control section 104 accesses the responding means in response to an operation such as click of the message memo by the mouse. The responding means may be selected by the user or set by the message system. A device for executing the responding mean may be installed in the communication terminal or in an external terminal connected to the communication terminal.

Figure 3:
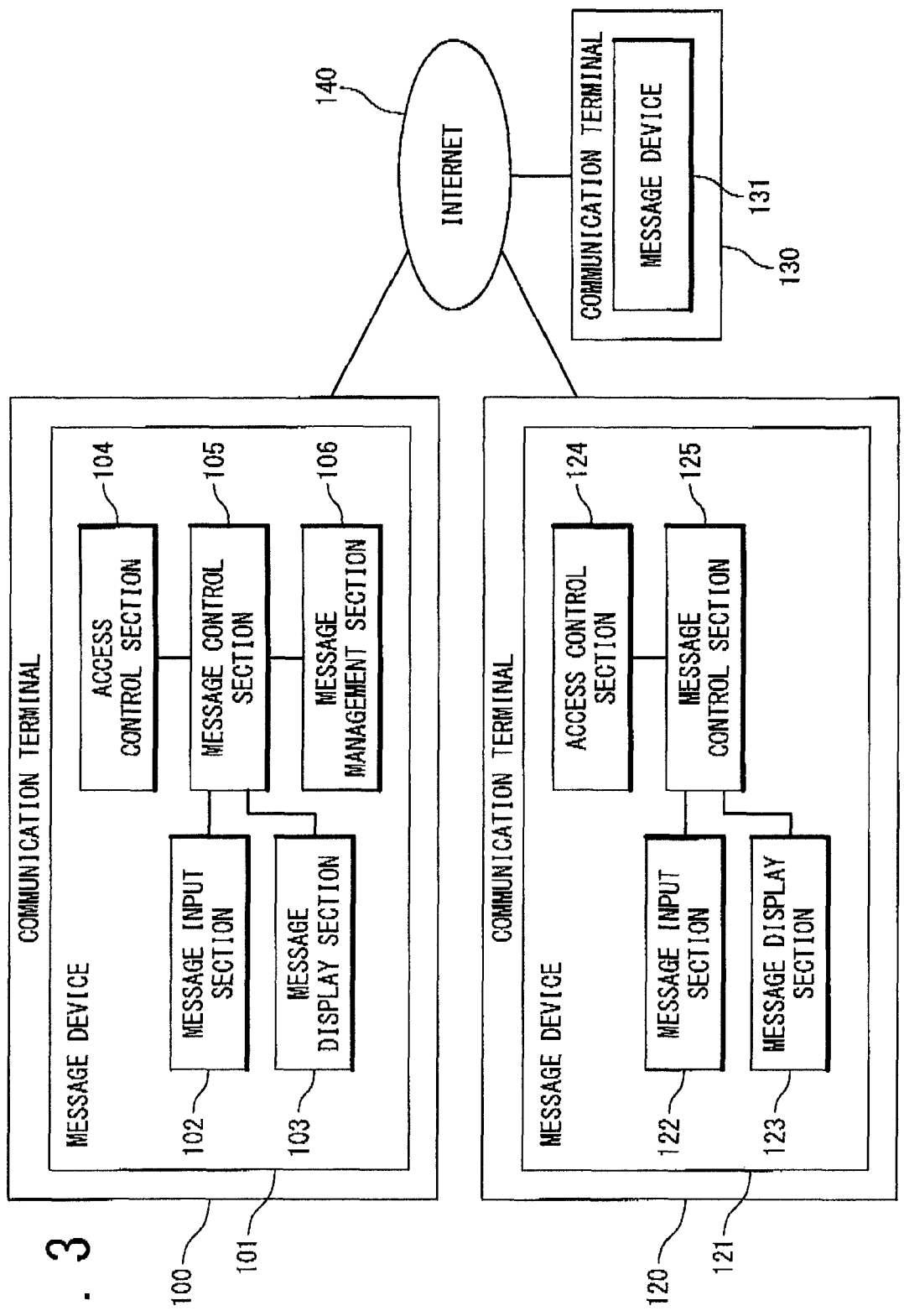
FIG. 3 is a block diagram showing a second system configuration of the message system according to the first exemplary embodiment.

The message management section 106 of the message device 101 may collectively manage the message data for each of all or a plurality of communication terminals of the message system. In that case, the message system may includes a communication terminal 120 which includes no message management section, as shown in FIG. 3. The communication terminal 120 includes a message device 121. The message device 121 includes a message input section 122, a message display section 123, an access control section 124, and a message control section 125.

The message input section 122 has the same function as the message input section 102. The message display section 123 has the same function as the message display section 103. The access control section 124 has the same function as the access control section 104. The message control section 125 has the same function as the message control section 105. The message management section 106 functions to manage the message data collectively. A communication terminal 130 includes a massage device 131 which has the same function as the message device 101 or the message device 121. A network 140 includes one or more kinds of communication circuits.

Figure 4:
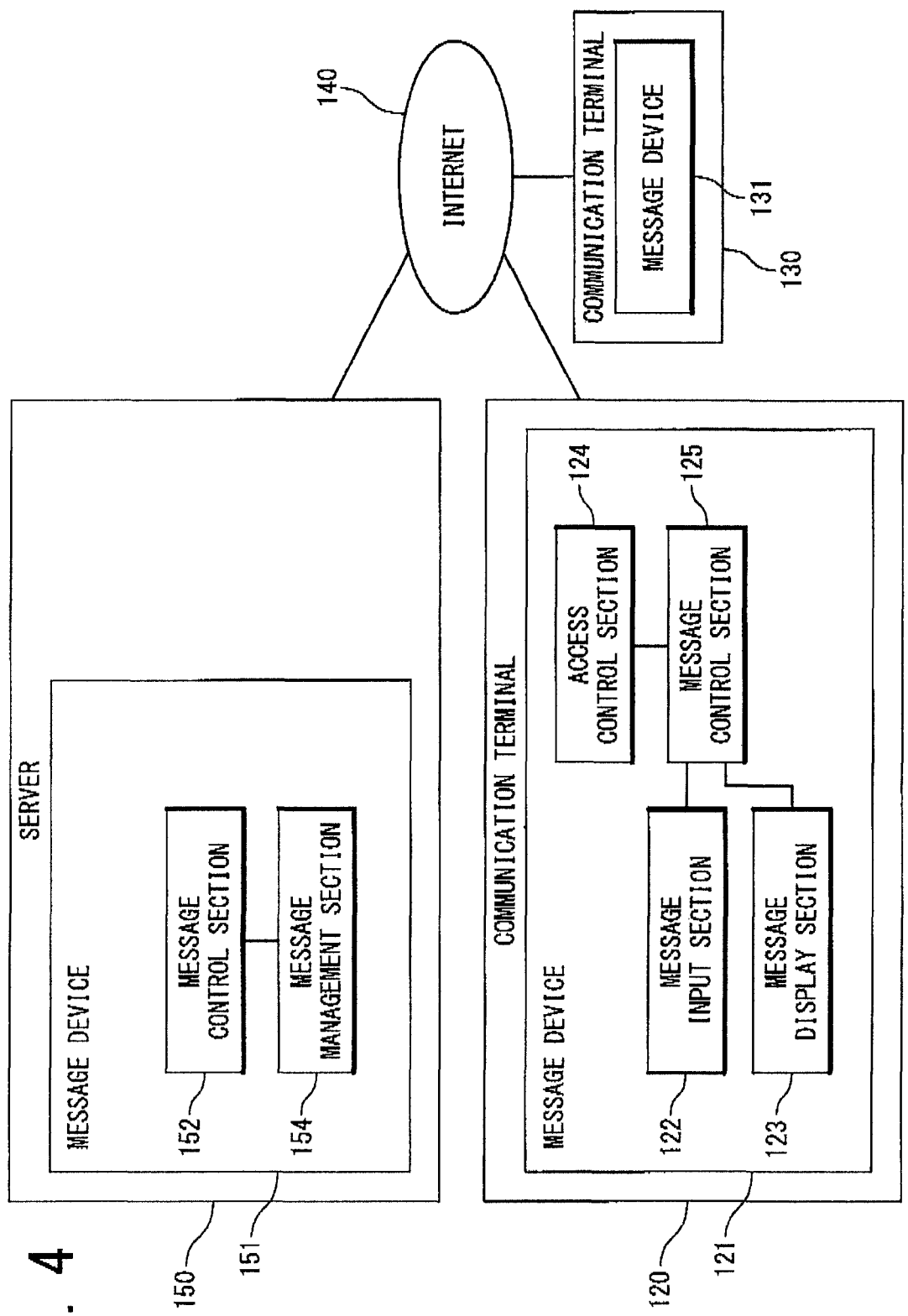
FIG. 4 is a block diagram showing a third system configuration of the message system according to the first exemplary embodiment.

The message system may includes one or more servers and two or more communication terminal. The server includes a message control section and a message management section. The message management section of the server collectively manages message data for each of all or a plurality of the communication terminals of the message system. In that case, a system configuration of the message system is shown in FIG. 4 and the communication terminal 120 without message management section is permitted to exist in the message system. The server 150 includes a message device which includes the message control section 152 and the message management section 154. The message control section 152 has the same function as the message control section 106. The message management section 154 has almost the same function as the message management section 106. The message management section 154 manages the message data collectively. The message device 131 of the communication terminal 130 has the same function as the message device 121. The server 150 may includes a presence management device which manages connection states of the communication terminals of the message system.

According to the above message system, the message data is shared between the communication terminals of the sender and the receiver of the message, the status of the massage data is recognized visually, the message can be understood at a glance, forgetting to communicate with the opposite party is prevented, and the user can communicate with the opposite party easily through the message memo.

Next, a message system according to a first example of the first exemplary embodiment will be described in detail.

Figure 5:
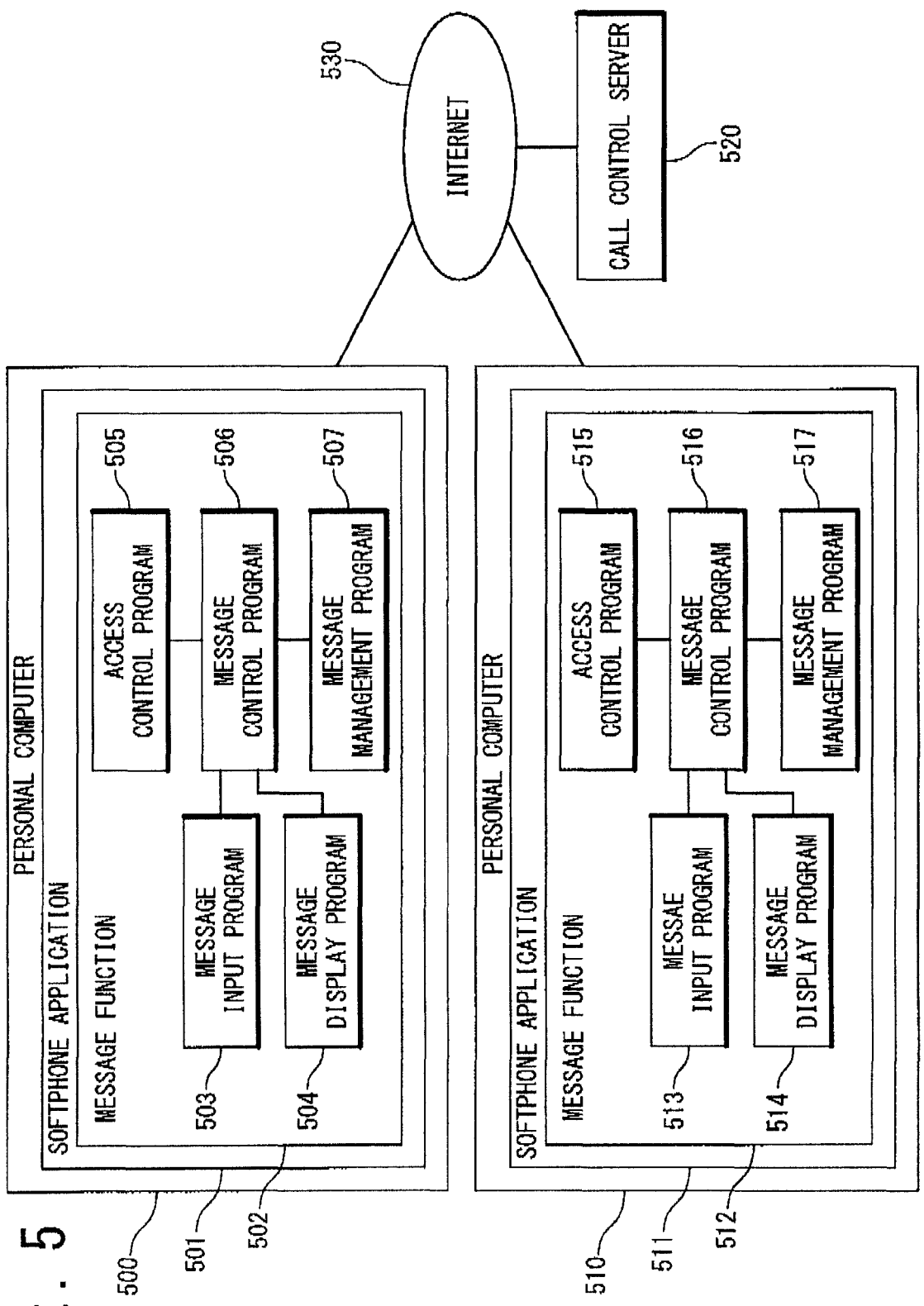
FIG. 5 is a block diagram showing a message system according to a first example of the first exemplary embodiment.

Referring to FIG. 5, the message system according to the first example includes a personal computer 500, a personal computer 510, and a call control server 520.

The personal computer 500 is used by a user A. The personal computer 510 is used by a user B. The call control server 520 executes call controls between the personal computers. The personal computer 500, the personal computer 510, and the call control server 520 communicates via the Internet 530. The Internet 530 includes an electric communication circuit. The Internet 530 can use a public telephone network or a private circuit. The Internet 530 can use any of wired and wireless communication circuits.

On the personal computer 500, a softphone application 501 for conversation operates. The softphone application 501 includes a message function 502 and a conversation function using the VoIP (Voice over Internet Protocol) method. The message function 502 includes a message input program 503, a message display program 504, an access control program 505, a message control program 506 and a message management program 507.

When the message function 502 corresponds to the message device 101 of FIG. 1, the message input program 503 corresponds to the message input section 102, the message display program 504 corresponds to the message display section 103, the access control program 505 corresponds to the access control section 104, the message control program 506 corresponds to the message control section 105 and the message management program 507 corresponds to the message management section 106.

On the personal computer 510, a softphone application 511 for conversation operates. The softphone application 511 includes a message function 512 and a communicating function using the VoIP method. The message function 512 includes a message input program 513, a message display program 514, an access control program 515, a message control program 516 and a message management program 517. The message function 512 operates in the same manner as the message function 502.

Each program on any of the personal computers as communication terminals is assumed to be stored physically in a hard disk (not shown) installed in the computer and to be transferred from a central processing unit (CPU) (not shown) installed in the computer to a memory (not shown) to be executed as necessary. The conversation function of the softphone application is connected to the softphone application of the opposite party via the call control server 520.

Schematically, those programs operate in the following manners.

Figure 6:
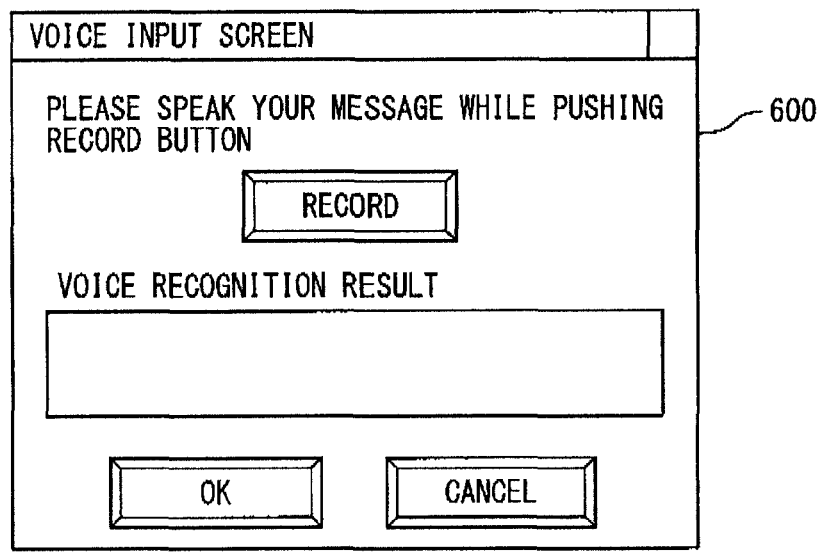
FIG. 6 shows an example of a voice input screen.

The message input program 503 (or 513) converts voice data, which is inputted from a microphone device provided to the personal computer by using a voice input screen 600 shown in FIG. 6, into voice file, and executes a voice recognition on the voice data to generate text data. In response to a push down of an OK button of the voice input screen 600, the message input program 503 (or 513) delivers new message data to the message control program 506 (or 516). The new message data includes data which indicates where the voice file and the text data are saved and a data which indicate the date and time (for example, Mar. 7, 2006, 9:25:00 a.m.) when the OK button is pushed down.

Upon detecting a click operation by a mouse on a message memo displayed by the message display program 504 (or 514), the message input program 503 (or 513) delivers operation data to the message control program 506 (or 516). The operation data includes destination data (an address for identifying the opposite party) which is associated with the message memo. When the delete button of the message memo is clicked, the message input program 503 (or 513) notifies the message control program 506 (or 516) of the operation of the delete button.

Upon receiving the new message data from the message input program 503 (or 513), the message control program 506 (or 516) directs the message management program 507 (or 517) to save the new message data to which the message-writer data and the destination data are added, and transmits the new message data to the personal computer of the opposite party. When the message control program 506 (or 516) receives new message data from other personal computer, the message control program 506 (or 516) simply directs the message management program 507 (or 517) to save the new message data.

The message control program 506 (or 516) delivers to the access control program 505 (or 515) the operation data received from the message input program 503 (or 513) and directs the message management program 507 (or 517) to update the message data.

When the message memo is displayed at first or when the status of the message data is updated, the message control program 506 (or 516) obtains the message data from the message management program 507 (or 517) and delivers the message data to the message display program 504 (or 514).

The message management program 507 (or 517) saves the message data in the hard disk (not shown). Upon directed from the message control program 506 (or 516), the message management program 507 (or 517) updates the message data based on the direction. The message management program 507 (or 517) assigns a unique management number to each message data. The message data is identified based on the unique management number.

Figure 7:
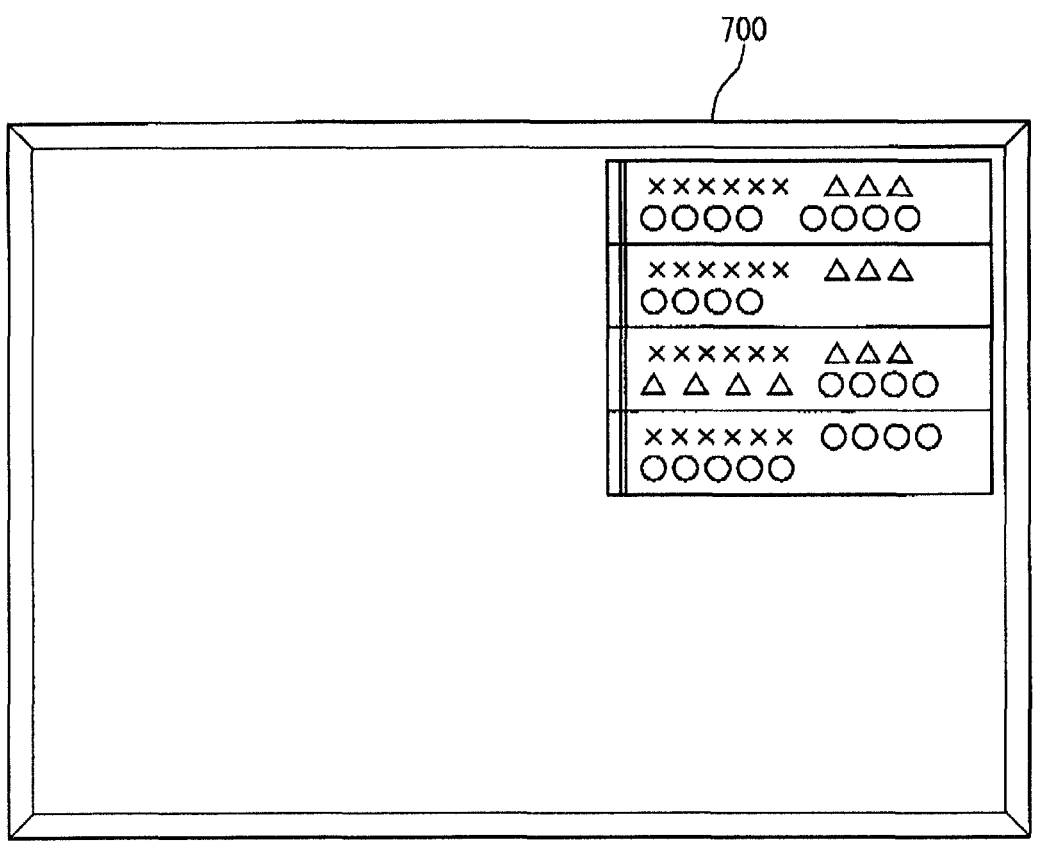
FIG. 7 shows message memos on a display.

The message display program 504 (or 514) analyzes the message data delivered from the message control program 506 (or 516) to generate the message memo of tag-form shown in FIG. 2. One message memo is generated for each message data. When there are a plurality of message memos, the message display program 504 (or 514) displays the plurality of message memos in a line or a matrix on a display 700, as shown in FIG. 7.

Upon receiving the operation data from the message control program 506 (or 516), the access control program 505 (or 515) delivers the operation data to the conversation function of the softphone application to execute the conversation function.

Figure 8:
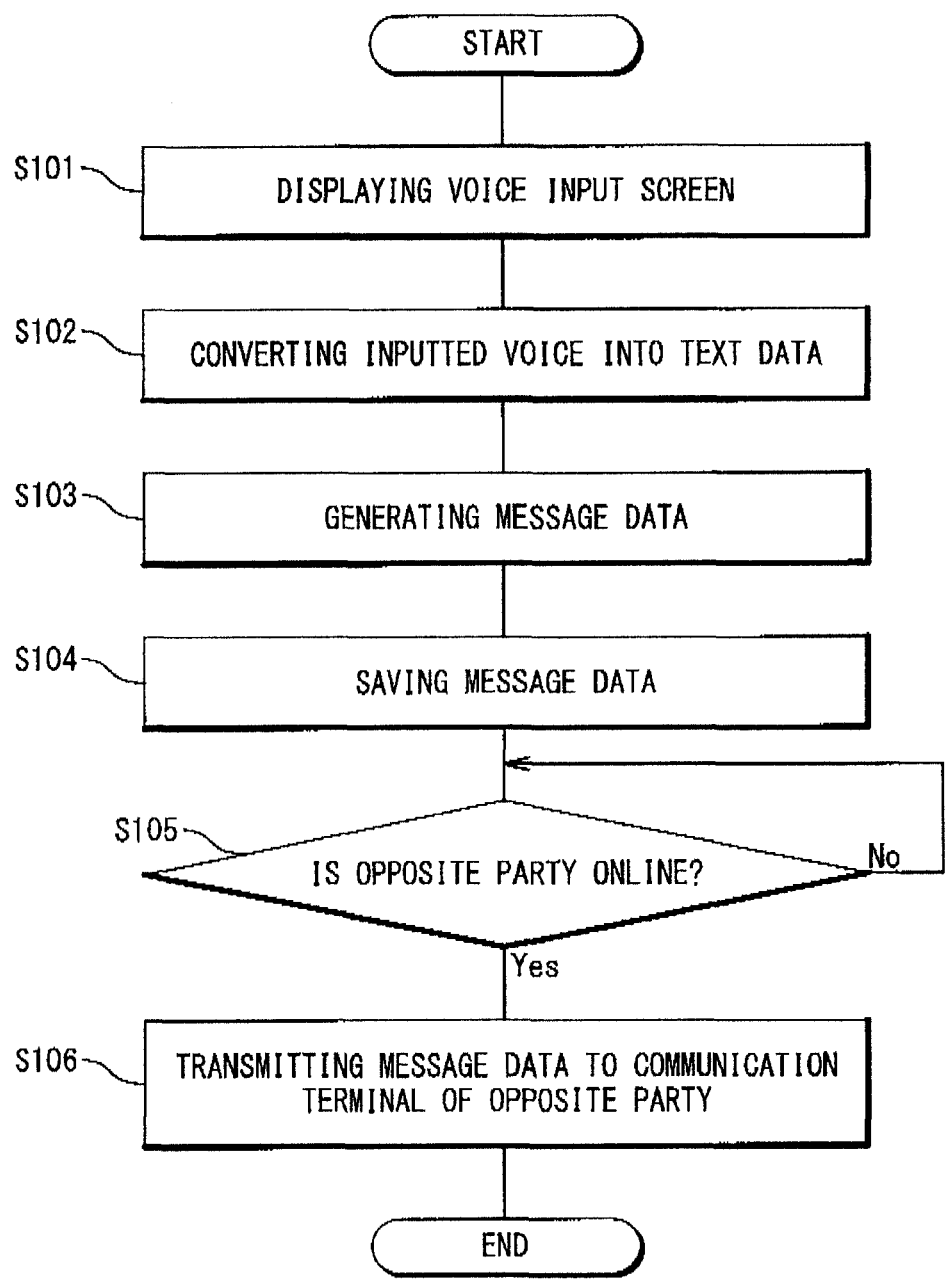
FIG. 8 is a flowchart of an operation for generating and sending a message data.

Referring to a flowchart of FIG. 8, an operation according to the first example will be described. In the operation, the message data is generated and is sent to the receiver of the message.

(1) Step S101

The user A makes the softphone application 501 to make a phone call in order to communicate with the user B. However, the user B is out and not able to answer the phone call. Upon detecting that the user B can not answer the phone call, the softphone application 501 accesses the message input program 503. The message input program 503 displays the voice input screen 600 shown in FIG. 6.

(2) Step S102

The user A speaks a message to the microphone while pushing a record button of the voice input screen 600 by using the mouse. Voice recognition is performed on the message to display the resultant text in a voice recognition result box of the voice input screen 600. The user A pushes the OK button of the voice input screen 600 after checking the text data.

(3) Step S103

Figure 9:
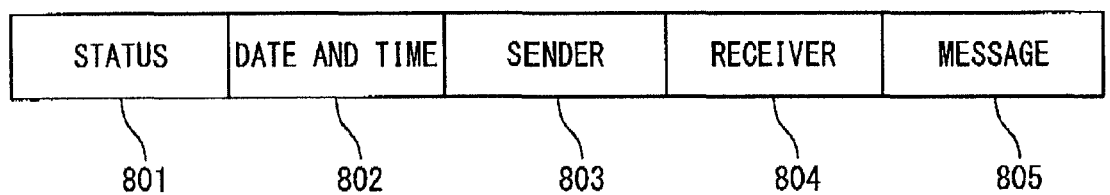
FIG. 9 shows a data format of the message data.

FIG. 9 shows a data format of the message data. When the message data newly generated, a value indicating an "unread" state is provided for a status 801. The date and time when the OK button of the voice input screen 600 is pushed is provided for a transmission date and time 802. The user name of the user A and the address for identifying the user A is provided for a sender data 803. The user name of the user B and the address for identifying the user B is provided for a receiver data 804. The data indicating where a voice file and a message file are saved is provided for a message content 805. The voice file records the message as voice data. The message file records the text data of the message.

(4) Step S104

The message data generated as described above is saved in the disk of the personal computer 500. Specifically, a unique folder is generated, and a file of the message data (hereinafter, referred to as message data file), the voice file and the message file are saved in the unique folder. A name indicating the date and time of transmission, such as "20060703092600", is considered as a name of the unique folder. Then, a display of the personal computer 500 displays the message memo, as shown in FIG. 2. The date and time area 201 shows the date and time of the transmission based on the transmission date and time 802. The opposite party area 202 shows the receiver based on the receiver data 804. The message area 203 shows where the voice and message files are stored based on the message content 805. A background color of the message memo is green which indicates the "unread" state.

(5) Step S105

The message control program 506 checks a start-up state of the softphone application 511 in a predetermined interval until the softphone application 511 of the user B becomes an online state.

(6) Step S106

When the softphone application 511 becomes the online state, the message data file, the voice file and message file, which are described in the above step S104, are transmitted to the softphone application 511 of the user B. The softphone application 511 saves the received files to the disk of the personal computer 510.

Figure 10:
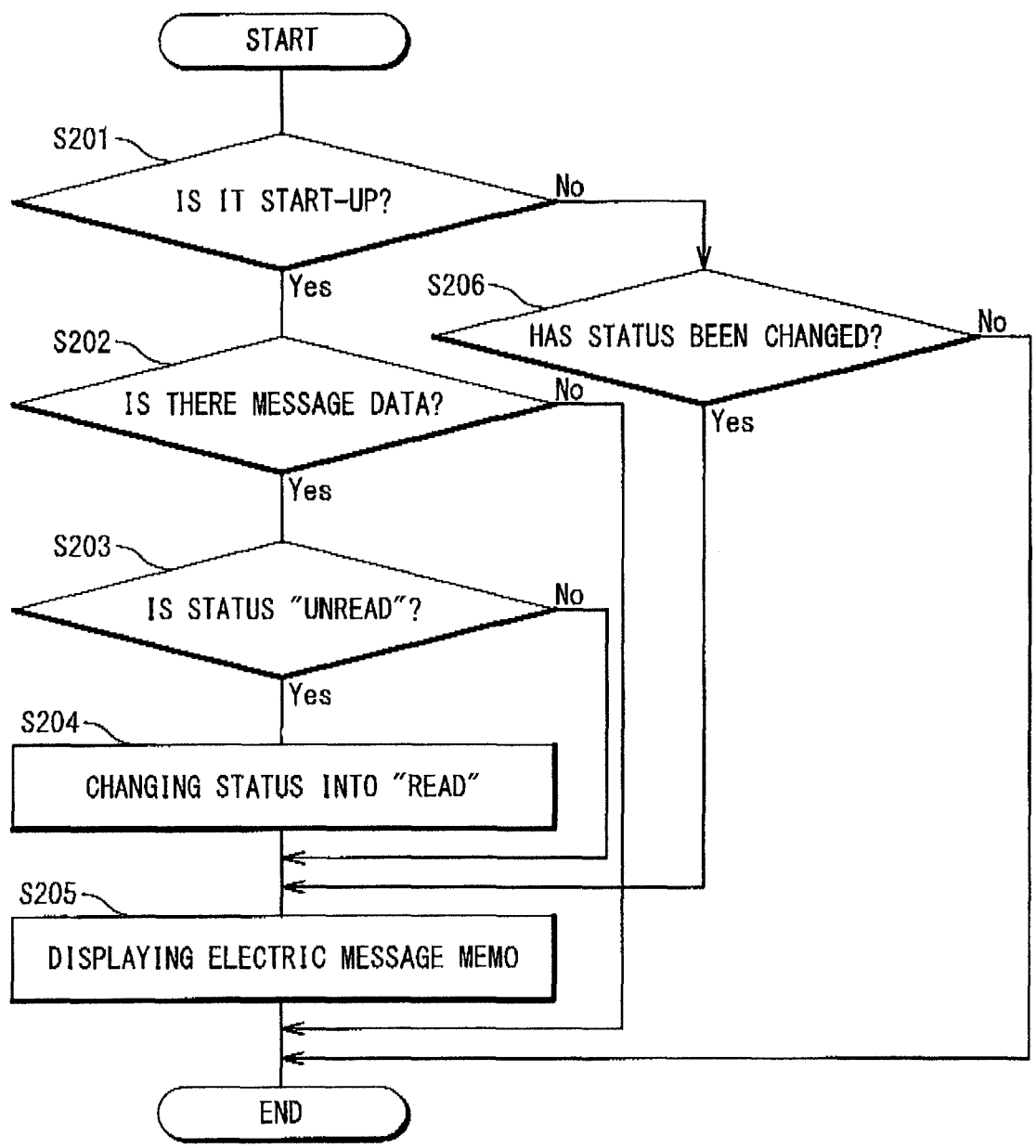
FIG. 10 is a flowchart of an operation for generating a message memo and sharing a status of the message data between a sender and a receiver of the message data.

Next, referring to a flowchart of FIG. 10, an operation according to the first example will be described. In the operation, the message memo is generated and the status of the message data is shared between the sender and the receiver of the message.

(1) Step S201

Upon started up, the softphone application 511 checks whether the message data file has been newly received.

(2) Step S202

When the message data file has been newly received, the file is saved (see step S106). Then, all of the saved message data files are read out. When there is no newly received message data file, the operation ends.

(3) Step S203

Then, it is checked whether the status of the message data is "unread".

(4) Step S204

When the status of the message data is "unread", the status is changed into a value indicating "read", and the message data after the change is saved in place of the message data before the change. A change notice is transmitted to the softphone application 501 of the user A to notify the user A that the status is changed. The change notice includes the status value and the name of the folder in which the message data is saved.

(5) Step S205

The softphone application 511 displays the message memo on a display of the personal computer 510, as shown in FIG. 2. The date and time area 201 shows the date and time of the transmission based on the transmission date and time 802. The opposite party area 202 shows the receiver based on the receiver data 804. The message area 203 shows where the voice and message files are stored based on the message content 805. A background color of the message memo is yellow which indicates the "read" state.

(6) Step S206

The softphone application 501 of the user A has already started up. Thus, upon receiving the change notice from the user B, the softphone application 501 changes the status of the corresponding message data and updates the background color of the displaying message memo into yellow which indicates the "read" state.

Next, an operation according to the first example will be described. The operation is concerning to the operation to the message memo.

The user B sees the message memo of tag form displayed on the display of the personal computer 510. When the user B can not understand the meaning of the message due to the error in the voice recognition, the user B clicks the play button 204 in the message area 203 of FIG. 2 to play the voice file which records the message spoken by the user A. Thus, the user B can understand the meaning of the message.

The user B clicks the display area 200 for the message memo with the mouse to make a communication with the user A. Upon detecting the click on the message memo, the sender data of the corresponding message data is retrieved, and the conversation function of the softphone application 511 is executed immediately to make a call to the softphone application 501 of the user A. When the user A notices that the background color of the corresponding message memo has been changed from green which indicates the "unread" state to yellow which indicates the "read" state, the user A can make a call to the user B by clicking the message memo displayed on the display of the personal computer 500.

When the user A or the user B clicks the message memo and succeeds to make a communication with each other, the status of each message data is changed into a value indicating "communicated", and each massage data is saved after completing the conversation. Further, the background color of the corresponding message memo is changed into blue which indicates the "communicated" state.

Furthermore, when the answer to the message is completed and it becomes unnecessary to make a communication with the opposite party, the user B clicks the delete button 205 of the message memo. When the delete button is pushed by the operation of the user, the message control program 516 deletes the folder in which the corresponding message data is saved, and transmits a change notice to the softphone application 501 of the user A to notify the user A that the message data is deleted. The change notice includes the name of the folder in which the message data is saved, and the status value indicating "deleted". Upon receiving the change notice from the user B, the softphone application 501 of the user A changes the status of the corresponding message data, and updates the displaying message memo such that the background color of the message memo is changed into gray which indicates a state of "deleted".

In the first example, the status of each message data is shared between the sender and the receiver of the message data, and the process status of the message data is reflected on the background color of the message memo in real time. Thus, the correspondence state concerning to the message memo can be recognized at a glance.

Further, since the user interface for detecting the click operation of the mouse is provided to the display area for the message memo, it becomes possible to start a conversation with the opposite party with which the message is shared by simply clicking the corresponding message memo intuitively, after knowing that it is necessary to make a communication with the opposite party by seeing the message memo.

Furthermore, each of the softphone applications does not need to manage the message data of the opposite party with which the message is shared, but simply needs to manage its own message data.

Next, a message system according to a second example of the first exemplary embodiment will be described in detail by referring to the accompanying drawings.

Figure 11:
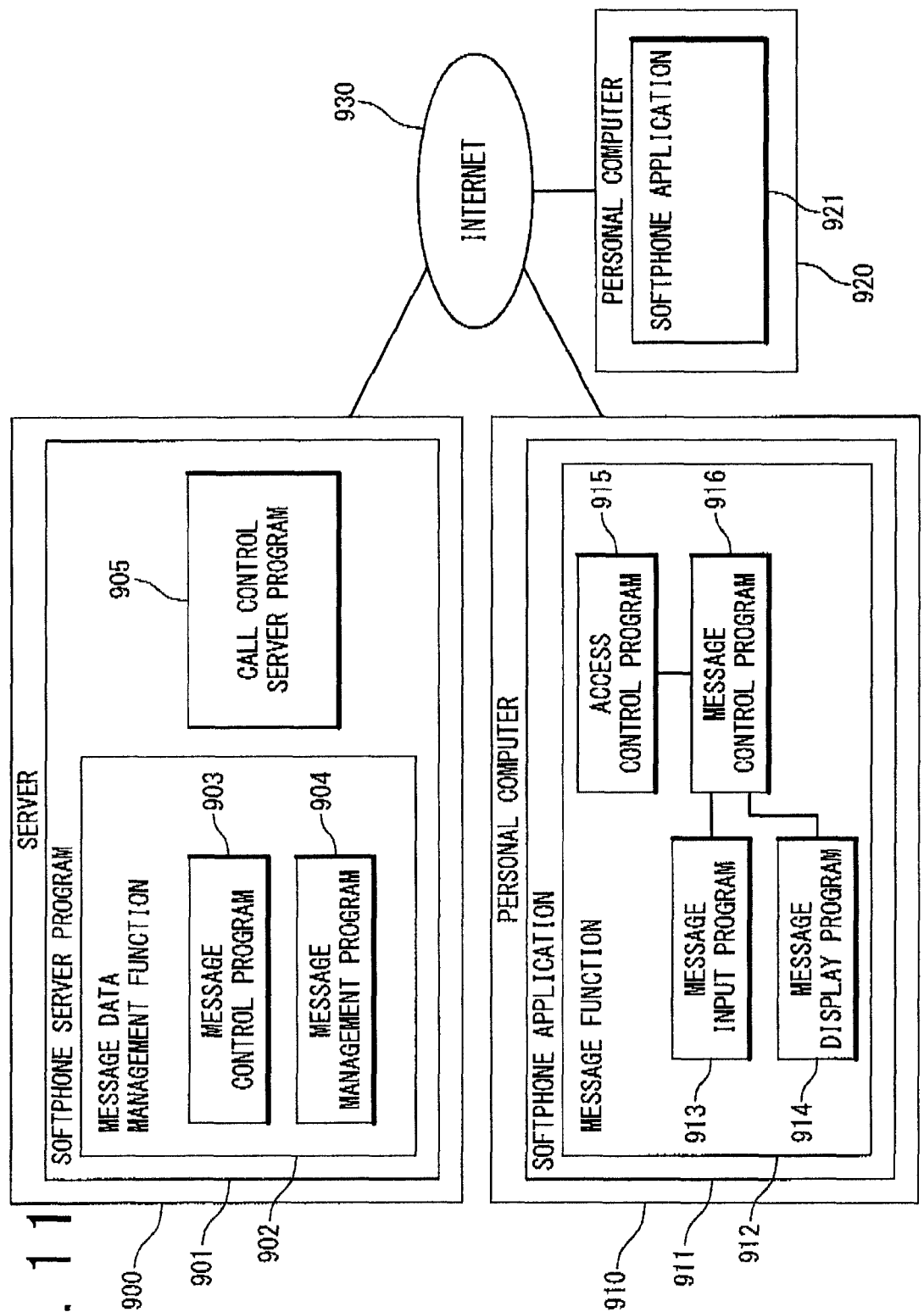
FIG. 11 is a block diagram showing a message system according to a second example of the second exemplary embodiment.

Referring to FIG. 11, the message system according to the second example includes a personal computer 910 used by the user A, a personal computer 920 used by the user B, and a server 900 for managing the message data of softphone applications collectively. The personal computer 910, the personal computer 920 and the server 900 communicate via Internet 930. Each of the personal computer 910, the personal computer 920 and the server 900 can communicate with another personal computer used by another user via the Internet 930. The Internet 930 includes an electric communication circuit. The Internet 930 can use a public telephone network or a private circuit. The Internet 930 can use any of wired and wireless communication circuits.

On the personal computer 910, a softphone application 911 for conversation operates. The softphone application 911 includes a message function 912 and a conversation function which uses the VoIP method. The message function 912 includes a message input program 913, a message display program 914, an access control program 915, and a message control program 916.

On the personal computer 920, a softphone application 921 for conversation operates. The softphone application 921 includes a message function (not shown) which has the same function as the message function 912 and a conversation function which uses the VoIP method. As same as the message function 912, the message function of the softphone application 921 includes a message input program, a message display program, an access control program and a message control program. These programs operate in the same manner as the corresponding programs of the message function 912.

On the server 900, a softphone server program 901 for managing message data of the softphone applications collectively and a call control server program 905 for controlling calls of outgoing and incoming between the conversation functions of the softphone applications are operated. The softphone server program 901 includes a message data management function 902 which includes a message control program 903 and a message management program 904.

Each program on any of the personal computers is assumed to be physically stored in a hard disk (not shown) provided to the computer and to be transferred from a central processing unit (CPU) (not shown) provided to the computer as a terminal to a memory (not shown) to be executed as necessary. Further, the conversation function of the softphone application is connected to the softphone application of the opposite party via the call control server program 905.

Schematically, those programs operate in the following manners.

The message input program of each personal computer operates in the same manner as the message input program 503 of the first example.

The message display program of each personal computer operates in the same manner as the message display program 504 of the first example.

The access control program of each personal computer operates in the same manner as the access control program 505 of the first example.

When message control program of each personal computer receives a new message data from the message input program of the personal computer, the message control program transmits, to the message control program 903, the new message data to which generator data and destination data are added.

Further, when the message memo is displayed at first or when the status of the message data is changed, the message control program of each personal computer obtains the message data from the message control program 903 of the server 900, and delivers it to the message display program.

Furthermore, the message control program of each personal computer delivers to the access control program an operation data received from the message input program of the personal computer, and transmits change data of the message data to the message control program 903 of the server 900.

The message control program 903 of the server 900 directs the message management program 904 to save the new message data received from the message control program of the personal computer, and transmits the new message data to the personal computer of the opposite party to which the message is to be sent.

Further, when the message control program 903 of the server 900 receives the change notice of the message data from the message control program of the personal computer, the message control program 903 directs the message management program to update the message data.

Furthermore, when the message control program 903 of the server 900 receives, from the message control program of the personal computer, a request for obtaining the message data, the message control program 903 obtains the corresponding message data from the message management program, and delivers it to the message control program of the personal computer.

The message management program 904 of the server 900 operates in the almost same manner as the message management program 507 according to the first example. However, since the message management program 904 manages a plurality of message data for a plurality of users, the message management program 904 and message management program 507 are different in the structure of directories for saving the message data.

Next, referring to the flowchart of FIG. 8, an operation according to the second example will be described. In the operation, the message data is generated and sent to the receiver of the message.

(1) Step S101

The user A makes the softphone application 911 to make a phone call to the user B in order to make a communication with the user B. However, the user B is out and not able to answer the phone call. Upon detecting that the user B cannot answer the phone call, the softphone application 911 accesses the message input program 913. The message input program 913 displays the voice input screen 600 shown in FIG. 6.

(2) Step S102

The user A speaks a message to the microphone while pushing the record button of the voice input screen 600 through the mouse. Voice recognition is performed on the message spoken by the user A to display the message as text in the voice recognition result box of the voice input screen 600. The user A pushes the OK button of the voice input screen 600 after conforming the text. The message control program 916 transmits, to the message control program 904 of the server 900, new message data, a voice file which records the message spoken by the user A, and a message file which records the text data. The new message data includes the data which indicates the date and time when the OK button of the voice input screen 600 is pushed, the generator data which indicates the user A, the destination data which indicates the user B, and a status data which indicates the new messaged data is generated newly.

(3) Step S103

FIG. 9 shows a data format of the message data. When the message control program 904 newly generates the message data, a value indicating "unread" is provided for the status 801. The date and time included in the new message data received from the message control program 916 are provided for the transmission date and time 802. The user name of the user A and the address for identifying the user A are provided for the sender data 803. The user name of the user B and the address for identifying the user B are provided for the receiver data 804. The voice and message files received from the message control program 916 are saved in a disk of the server 900. The data which indicates where the voice and message files are saved is provided for the message content 805.

(4) Step S104

The message data generated as described above is saved in the disk of the server 900. Specifically, a folder A and a folder B are generated. The folder A uses the address for identifying the user A as the sender of the message. The folder B uses the address for identifying the user B as the receiver of the message. In each of the folder A and the folder B, a unique name folder is generated. In the unique name folder, a file of the message data, the voice file and the message file are saved. The name of the unique name folder is considered to be a name indicating the date and time of transmission, such as "20060703092600". Then, a display of the personal computer 910 displays the message memo, as shown in FIG. 2. The date and time area 201 shows the date and time of the transmission based on the transmission date and time 802. The opposite party area 202 shows the receiver based on the receiver information 804. The message area 203 shows where the voice and message files are saved based on the message content 805, A background color of the message memo is green which indicates the "unread" state.

(5) Step S105

The message control program 903 of the server 900 checks a start-up state of the softphone application 921 in a predetermined interval until the softphone application 921 of the user B becomes an online state. When the softphone application 921 starts up, the message control program of the softphone application 921 may notify the message control program 903 of the server 900 that the softphone application 921 starts up.

In the second example, the server 900 manages the message data collectively. Thus, a process to transmit the message data to the terminal of the opposite party as described in the step 106 is not necessary.

Next, referring to the flowchart of FIG. 10, an operation according to the second example will be described. In the operation, the electric message memo is generated and the status of the message data is shared between the sender and the receiver of the message.

(1) Step S201

Upon started up, the softphone application 921 checks whether or not there is a file in the folder B in the server 900.

(2) Step S202

When there is the file, the softphone application 921 requests the softphone server program 902 to send all the files in the folder B.

(3) Step S203

Then, it is checked whether the status of the message data received from the softphone server 902 is "unread".

(4) Step S204

When the status of the message data of the user B is "unread", the status of the message data of the user B and the status of the message data of the user A are changed into a value indicating "read". A change notice is transmitted to the softphone application 911 of the user A. The change notice includes the identifier (the folder name which uses the transmission date and time) of the message data and the status value.

(5) Step S205

Then, the softphone application 921 of the user B displays the electric message memo on a display of the personal computer 920, as shown in FIG. 2. The date and time area 201 shows the date and time of the transmission based on the transmission date and time 802. The opposite party area 202 shows the receiver based on the receiver data 804. The message area 203 shows where the voice and message files are saved based on the message content 805. A background color of the message memo is yellow which indicates the "read" state.

(6) Step S206

The softphone application 911 of the user A has already started up. Thus, upon receiving the change notice from the softphone server program 902, the softphone application 911 updates the background color of the displaying message memo into yellow which indicates "read" state.

Next, referring to a flowchart of FIG. 12, an operation according to the second example will be described. The operation is concerning to the operation to the message memo.

(1) Step S301

The user B sees the message memo of tag form displayed on the display of the personal computer 920. When the user B can not understand the meaning of the message due to the error in the voice recognition, the user B clicks the play button 204 in the message area 203 of FIG. 2 to play the voice file which records the message spoken by the user A. Thus, the user B can understand the meaning of the message.

(2) Step S302

The user B clicks the display area 200 for the message memo with the mouse to make a communication with the user A. Upon detecting the click on the message memo, the sender data of the corresponding message data is retrieved, and the conversation function of the softphone application 921 is executed immediately to make a call to the softphone application 911 of the user A. When the user A notices that the background color of the corresponding message memo has been changed from green which indicates the "unread" state to yellow which indicates the "read" state, the user A can make a call to the user B by clicking the message memo displayed on the display of the personal computer 910.

(3) Step S303

When the user A or the user B clicks the message memo and succeeds to make a communication with each other, the status of the message data corresponding to the user which makes the call is changed into a value indicating "communicated". Then, the softphone application, which makes the call, transmits the change notice to the softphone server program 902 to change the status of the message data corresponding to the communication into "communicated" state. The change notice includes the identifier (the folder name which uses the transmission date and time) of the message data and the status value indicating communicated".

(4) Step S304

Furthermore, when the answer to the message is completed and it becomes unnecessary to make a communication with the opposite party, the user A or the user B clicks the delete button 205 of the message memo. A deletion process may be executed automatically immediately after the status value is changed into "communicated" or when a predetermined duration has passed after the status value is changed.

(5) Step S305

When the delete button is pushed by the operation of the user, the softphone application transmits a change notice to the softphone server program 902 to change the status of the message data into deleted state. The change notice includes the identifier (the folder name which uses the transmission date and time) of the message data and the status value indicating "deleted".

(6) Step S306

When the softphone server program 902 receives the change notice including the status value which indicates "communicated", the message management program 904 changes the status of the message data of the user A and the status of the message data of the user B into a status value indicating the "communicated", and saves the message data after the change in place of the message data before the change. Further, when the softphone server program 902 receives the change notice including the status value which indicates "deleted", the folder (which has the folder name using the date and time of the transmission) in which the message data corresponding to the user which pushed the delete button is saved is deleted, the status of the message data corresponding to the user of the opposite party is changed into a value indicating "deleted" and the message data after the change is saved in place of the message data before the change.

Furthermore, the softphone server 902 transmits, to the softphone application of the user of the opposite party, a change notice including the identifier (the folder name using the transmission date and time) of the message data and the status value indicating "communicated" or "deleted".

(7) Step S307

Upon receiving the change notice from the softphone server program 902, the softphone application of the user of the opposite party changes the status of the corresponding message data and updates the displaying message memo such that the background color of the message memo is changed into blue which indicates the "communicated" state in case that the status of the message data is "communicated" state. The softphone application updates the displaying message memo such that the background color of the message memo is change into gray which indicates the "deleted" state. As for the message memo being displayed for the user which performs the operation for the communication or the deletion, the background color of the message memo may be changed in response to the operation of the user or to the reception of the change notice from the softphone server program 902 as described in the case of the user of the opposite party.

Further, the present invention can be applied not only to one-to-one communication between the users A and B but also to a communication among more than three persons, such as communication network and Push-to-Talk (PTT). In this case, the change notice is transmitted to all the users concerned. Furthermore, when the background color of the message memo is changed into the color indicating "read" state or "communicated" state, it is preferable that name and identification data of the user corresponding to "read" state or "communicated" state are displayed along with the message memo. It is also preferable that name and identification data of a user other than the user corresponding to "read" state or "communicated" state are displayed along with the message memo. The message data can be managed collectively in the communication among more than three persons by using the server.

The massage system may include a plurality of servers. In this case, the communication terminal of the user which performs the operation transmits the change notice to all the servers concerned, or, the server which receives the change notice forwards the change notice to each of the other servers or executes synchronization. The synchronization is preferably executed in response to the reception of the change notice. It is also preferable that the synchronization is executed in a predetermined interval.

In the second example, the status of each message data is shared between the sender and the receiver of the message data, and the process status of the message data is reflected on the background color of the message memo in real time. Thus, the correspondence state concerning to the message memo can be recognized at a glance.

Further, since the user interface for detecting the click operation of the mouse is provided to the display area for the message memo, it becomes possible to start a conversation with the opposite party with which the message is shared by simply clicking the corresponding message memo intuitively, after knowing that it is necessary to make a communication with the opposite party by seeing the message memo.

The collective management of the message data by the server(s) prevents the delay of transmission of the message data and the user to delete the message data by mistake. In those points, the message system according to the second example is superior to the message system according to the first example. In the first example, the latest message data can not be transmitted between the personal computers of the sender and the receiver when both of the personal computers are not online state. In the first example, the message data saved in the personal computer of the user can be deleted by mistake by the user.

A second exemplary embodiment of the present invention will be described below.

In the present exemplary embodiment, a communication based on a message memo of the past is provided. Such communication may be called as a retrospective communication. When a message from one to another is recorded by an automatic telephone message recorder, a communication between the one and the other often ends when the other calls the one after hearing the message. In the present exemplary embodiment, electric documents or hand-written memos used in the communication (conversation) which has started by clicking the message memo are shared between the sender and the receiver of the message data by accessing to the message data corresponding to the message memo during the next communication between the sender and the receiver. Thus, the next communication can be activated. For example, the electric documents or the hand-written memos are displayed on the displays of the sender and the receiver to be shared.

For example, a saving means saves the path of the file which is referred by application in the telephone session (conversation) or the Uniform Resource Locator (URL) accessed by a browser in the telephone session such that the path or the URL is associated with the session. When the user refers to the session of the past, the data of the path or the URL is presented and the operation executed in the conversation is reproduced based on the path or the URL.

Specific operation according to the present embodiment will be described.

The message management section saves an operation executed in the process of making the communication between the communication terminals of the sender side and the receiver side of the message data as communication content such that the communication content is associated with the message data. The message control section retrieves the message data of the past. The access control section accesses a function for executing the selected communication content.

The responding means is accessed by the operation by the sender or the receiver of the message data to start a communication. When the command for referring to the logs of the past is spoken or the operation for referring to the logs of the past is performed during the communication, the message control section retrieves the past message data corresponding to the opposite party with which the communication is now being executed, and message display section displays a list of communication log. For example, the list of communication log shows a plurality of the message data of the past, which correspond to the opposite party with which the communication is now being executed, arranged in a time-series manner. For displaying the list of communication log, a log button may be provided to the message memo. It is also possible that a menu of the message system is displayed when a right click of the mouse is performed on the display communication terminal.

Further, the list of communication log can be narrowed down based on a designated keyword. To designate the keyword, the keyword spoken following the command for referring to the logs may be detected or a dialog box may be displayed when the menu of the message system is selected. Furthermore, the communication log to be retrieved is not limited to the communication content corresponding to the opposite party with which the communication is now being executed. The communication log may be retrieved based on designated date or user name.

As for the communication log, the message management section saves the path of the file referred by the sender or the receiver of the message, the URL accessed by the World Wide Web browser or the like during the communication started by the operation to the message memo as the communication content such that the communication content is associated with a management number of the message data. An event data indicating an operation of the mouse executed during the communication may be hooked and be saved as the communication content.

The message in the message data, a file name or a title of web page in the communication content, or, a word spoken in the communication can be used as the keyword.

When the sender or the receiver of the message selects one or more logs from the list of the communication log, the access control section accesses an application for disclosing the corresponding communication content. The communication content may be operated such that the communication content is shared between the sender and the receiver. For example, when an electric document is displayed in the sender side, the file of the electric document is send to the terminal of the receiver side and the same electric document is displayed in the receiver side. Thus, the electric document is shared between the sender and the receiver.

The message system according to the present invention can be applied to various kinds of communication terminals which are provided with the display device, and applied to a message function of a communication application including a telephone.

As described above, in the message system, the user interface which enables the operation by both of the sender and the receiver, the user inter face which reflects the operation states of the both or the user interface which cooperates with a response means such as telephone is implemented as the message memo.

In the message system, when the opposite party cannot answer an incoming call, the message memo is generated by the simple operation and sent to the opposite party, and the same message memo is displayed on the own terminal. The message memo indicates a state in which the opposite party can answer an incoming call or a state in which the communication concerning to the message memo is completed such that these states can be understood easily. Both of the sender and the receiver of the message can be prevented from forgetting to make a communication concerning to the message.

Furthermore, it is possible to start a communication with the opposite party instantly through a simple operation to the message memo.

The first exemplary embodiment and the second exemplary embodiment can be combined.

The embodiments of the present invention can be described as follows.

An object in the embodiments is to provide a message system that utilizes "an electric message memo", which includes: a user interface capable of being operated by both a sender and a receiver of a massage, and a method thereof; a user interface capable of reflecting the operation states of the both, and a method thereof; and a user interface which is associated with responding means such as a telephone, and a method thereof.

Another object in the embodiments is to provide a message system which, when the opposite party cannot answer a call, makes an electric message memo and send it to the opposite party through a simple operation while displaying the electric message memo of the same content on one's own terminal.

Another object in the embodiments is to provide a message system, which can plainly display a state indicating whether or not the opposite party can respond to a call and a state indicating whether or not a reply for the message has been done, so that both the sender and the receiver of the message can be prevented from forgetting to make a communication for the message.

Another object in the embodiments is to provide a message system which can start a communication with the opposite party instantly through a simple operation in response to an electric message memo.

Another object in the embodiments is to provide a message system which, during a communication that is started in response to a message memo, can refer to a communication content that is executed based on another message memo.

A message system includes a plurality of communication terminal and a communication circuit which connects one and another of the plurality of communication terminal. Each of plurality of communication terminal includes: a means for displaying a message memo based on a message data; a means for changing a status of the message data in response to an operation to the message memo; a means for transmitting a notice of the change of the status to another communication terminal; a means for receiving a notice of a change of a status from another communication terminal; and a means for updating the message memo in response to the operation to the message memo or the notice of the change of the status from the other communication terminal.

The plurality of communication terminals includes a communication terminal of sender side and a communication terminal of receiver side. The communication terminal of sender side is configured to generate the message data, transmit the message data to another communication terminal, display the message memo based on the message data, change a status of the message data in response to an operation to the message memo or a notice of a change of a status of the message data and update the message memo such that the change of the status of the message data is recognized visually. The communication terminal of receiver side is configured to display the message memo based on the message data received from the communication terminal of sender side, change a status of the message data in response to an operation to the message memo, update the message memo such that the change of the status of the message data is recognized visually and transmit a notice of the change of the status of the message data to the communication terminal of sender side. The operation to the message memo displayed by any one of the communication terminal of sender side and the communication terminal of receiver side is reflected on the status of the message data of both the communication terminal of sender side and the communication terminal of receiver side.

Any one of the communication terminal of sender side and the communication terminal of receiver side is configured to make a communication with the other communication terminal in response to an operation to the message memo. The communication terminal of sender side and the communication terminal of receiver side are configured to change the status of the message data into a communicated state and display the message memo.

Any one of the communication terminal of sender side and the communication terminal of receiver side is configured to delete the message data and notify the other communication terminal that the message data is deleted. The other communication terminal is configured to change the status of the message data into a deleted state and display the message memo in response to the notification.

The message system further includes at least one server configured to manage the message data used by the communication terminal of sender side and the communication terminal of receiver side collectively, receives the notice of the status of the message data from any one of the communication terminal of sender side and the communication terminal of receiver side, change the status of the message data and notify the other communication terminal.

Each of the communication terminal is configured to save an operation executed during the communication with a predetermined communication terminal as a communication content such that the communication content is associated with the message data, retrieve a message memo shared with the predetermined communication terminal based on a predetermined condition during a communication with the predetermined communication terminal, execute a communication content associated with a message data corresponding to the predetermined condition and direct the predetermined communication terminal to execute the communication content associated with the message data corresponding to the predetermined condition.

A message system includes; a message input section configured to generate a message data by using a input screen, wherein the message data includes a message, a receiver data and a status data; a message control section configured to transmit the message data to a communication terminal of an opposite party to which the message should be sent; a message management section configured to change the status data from an unread state to a read state in response to a notice of a change of the status from the communication terminal of the opposite party, wherein the communication terminal of the opposite party is configured to disclose the message data; and a message display section configured to update a displayed content of the message data in response to the change of the status data.

The message system further includes a access control section configured to detect an operation to the message data displayed by the message display section and execute a function for communicating with the opposite party.

The message management section is configured to save an operation executed during a communication with the opposite party as communication content such that the communication content is associated with the message data. The message control section is configured to retrieve a message data of the past. The access control section is configured to access a function for executing a communication content associated with the message data of the past and notify the opposite party of the communication content associated with the message data of the past.

The message management section is configured to change the status data into a communicated state after a conversation with the communication terminal of the opposite party. The message display section is configured to update the displayed content of the message data such that the displayed content is changed into a displayed content indicating the communicated state.

The message management section is configured to change the status data into a deleted state in response to a notification that the message data is deleted from the communication terminal of the opposite party. The message display section is configured to update the displayed content of the message data such that the displayed content is changed into a displayed content indicating the deleted state.

When the message data is displayed at first or when the status of the message data is changed, the message control section obtains the message data from the message management section to the message display section.

A message system controlling method includes: a step in which a communication terminal of sender side generates a message data and transmits the message data to another communication terminal; a step in which the communication terminal of sender side displays a message memo based on the message data; a step in which a communication terminal displays the message memo based on the message data received from the communication terminal of sender side; and a step in which the communication terminal of sender side or the communication terminal of receiver side changes a status of the message data in response to an operation to the message memo or a notice of a change of the status of the message data and updates the message memo such that the change of the status of the message data is recognized visually.

The message system controlling method further includes: a step in which any one of the communication terminal of sender side or the communication terminal of receiver side makes a communication with the other communication terminal in response to an operation to the message memo, changes the status of the message data into a communicated state and displays the message memo.

The message system controlling method further includes: a step in which any one of the communication terminal of sender side or the communication terminal of receiver side deletes the message data and notifies the other communication terminal that the message data is deleted; and a step in which the communication terminal receives the notice that the message data is deleted, changes the status of the message data and displays the message memo.

The message system controlling method further includes: a step in which at least one server manages the message data used by the communication terminal of sender side and the communication terminal of receiver side collectively; and a step in which in response to the notice of the change of the status from any one of the communication terminal of sender side or the communication terminal of receiver side the at least one server changes the status of the message data and notifies the other communication terminal.

A message system controlling method includes: a step for generating a message data by using an input screen, wherein the massage data includes a message, a receiver data and a status data; a step for transmitting the message data to a communication terminal of an opposite party to which the message to be sent; a step for changing the status data form an unread state into a read state in response to a notice of a change of the message data from the communication terminal of the opposite party, which discloses the message data; and a step for updating a displayed content of the message data in response to the change of the status data.

The message system controlling method further includes: a step for detecting an operation to the displayed message data to execute a function for making a communication with the opposite party.

The message system controlling method further includes: a step for changing the status data into a communicated state after the conversation with the communication terminal of the opposite party; and a step for updating the displayed content of the message data such that the displayed content is changed into a displayed content indicating the communicated state.

The message system controlling method further includes: a step for changing the status data into a deleted state in response to a notice of a deletion of the message data from the communication terminal of the opposite party; and a step for updating the displayed content of the message data such that the displayed content is changed into a displayed content indicating the deleted state.

The message system controlling method further includes: a step in which the message memo is displayed when the message memo is displayed at first or when the status of the message data is changed.

The message system controlling method further includes: a step for associating an operation executed during communication with a predetermined communication terminal as communication content with the message data; a step for retrieving a message data of the past; a step for accessing a function for executing a communication content associated with the message data of the past; and a step notifying the predetermined communication terminal of the communication content associated with the message data of the past.

A program for a computer to execute the message system controlling method described in any one of the above paragraphs.

An effect is that it is possible to promote a communication with the opposite party by easily judging whether or not the opposite party has checked the message and has executed an action in response to the message. The reason for this is that a process status of the message information can be displayed visually through sharing the message both on the communication terminals of the sender and receiver, so that a matter that is necessary to make a communication can be recognized at a glance.

Another effect is that it is possible to communicate with the other part by looking at the content of an electric message memo and operating the terminal intuitively, so that a communication with the opposite party can be promoted. The reason for this is that it becomes unnecessary to start an application for making a response, through providing an interface for allowing the electric message memo to be associated with responding means, thereby enabling a quick response to be made.

Another effect is that contents exchanged in the past can be easily referred during a communication with the opposite party, so that the communication can be activated. The reason for this is that it is possible to utilize the communication contents exchanged in the past by a simple search, through relating the communication log, which is started from an operation executed in response to the message memo, to message data.

It is apparent that the present invention is not limited to the above exemplary embodiments, but may be modified and changed without departing from the scope and spirit of the invention.

What is claimed is:

1. A message system for conducting message, comprising:
    a plurality of communication terminals; and
    a communication circuit configured to connect one and another of said plurality of communication terminals,
    wherein each communication terminal of said plurality of communication terminals includes:
    a section which checks a connection state of a communication terminal of an opposite party, with which a communication is made;
    a section which displays an input screen for generating a message data when said communication terminal of the opposite part is in an offline state;
    a section which checks said connection state of said communication terminal of the opposite party in a predetermined interval until said communication terminal of the opposite party becomes in an online state;
    a section which transmits/receives said message data with said communication terminal of the opposite party when said communication terminal of the opposite party becomes in the online state;
    a section which displays a message memo based on said message data;
    a section which changes a status of said message data in response to an operation to said message memo;
    a section which transmits a change notice of said status of said message data to said communication terminal of the opposite party;
    a section which receives a change notice of said status of said message data from said communication terminal of the opposite party;
    a section which changes a display form of said message memo in response to said operation to said message memo or a content of said change notice of said status of said message data from said communication terminal of the opposite party;
    a section which saves an operation executed during a communication with said communication terminal of the opposite party as a communication content such that said communication content is associated with said message data;
    a section which retrieves the message memo shared with said communication terminal of the opposite party based on a predetermined condition during a communication with said communication terminal of the opposite party; and
    a section which executes a communication content associated with the message memo corresponding to said predetermined condition and directs said communication terminal of the opposite party to execute said communication content associated with said message memo corresponding to said predetermined condition.

2. The message system according to claim 1, wherein said each communication terminal further includes:
    a section which checks whether there is a first message data from said communication terminal of the opposite party;
    a section which when there are a plurality of message data from said communication terminal of the opposite party, respectively generates message memos of tag-form for said plurality of message data and displays said message memos to be arrayed on a screen; and
    a section which starts the communication with said communication terminal of the opposite party when any of said message memos displayed on said screen is selected.

3. The message system according to claim 1, wherein said each communication terminal further includes:
    a section which recognizes voice inputted to said input screen by using a microphone to convert a voice data into a text data;
    a section which displays a content of said text data on said input screen and transmits said text data and said voice data as said message data in response to an operation to said input screen; and
    a section which analyzes the message data from said communication terminal of the opposite party to generate the message memo based on the text data of said message data and reproduces the voice data of said message data in response to an operation to a play button displayed together with message memo.

4. The message system according to claim 1, wherein said each communication terminal further includes:
    a section which makes the communication with said communication terminal of the opposite party in response to the operation to said message memo and changes the status of said message data into a communicated state after said communication with said communication terminal of the opposite party when said communication with said communication terminal is made;

a section which when said communication with said communication terminal of opposite party, becomes unnecessary, deletes said message data and notifies said communication terminal of the opposite party that said message data is deleted; and a section which changes the status of said message data into a deleted state when receiving a notice that said message data is deleted from said communication terminal of the opposite party.

5. The message system according to claim 1, further comprising:

a server, wherein said server is connected to said communication circuit, generates a unique folder based on a transmission date and time of said message data when receiving said message data from said each communication terminal, saves said message d said folder to manage said message data correctively, receives a change notice of the status of said message data from said each communication terminal, changes the status of said message data, notifies said communication terminal of the opposite party that said status of said message data is changed, and deletes said folder in which said message data is saved when said message data becomes unnecessary.

6. A communication terminal comprising:

a message input section configured to generate a message data which stores a data of a message, a receiver data and a status data, which are inputted to an input screen;

a message control section configured to check a connection state of a communication terminal of an opposite party, with which a communication is made, check said connection state of said communication terminal of the opposite party in a predetermined interval until said communication terminal of the opposite party becomes in an online state when said communication terminal of opposite party is in a offline state, and transmit/receive said messaged data with said communication terminal of the opposite party when said communication terminal of the opposite party becomes an online state;

a message management section configured to manage said message data to make a change of said status data based on a content of a change notice of a status of said message data from said communication terminal of the opposite party;

a message display section configured to display a message memo based on said message data, change a display form of said message memo in response to a change of said status data, and display said input screen when said communication terminal of the opposite party is in an offline state; and an access control section configured to detect an operation to said message memo and execute a function for communicating with said communication terminal of opposite party, wherein said message control section saves an operation executed during a communication with said communication terminal of the opposite party as a communication content in said message management section such that said communication content is associated with said message data and retrieves a past message data shared with said communication terminal of the opposite party based on a predetermined condition during a communication with said communication terminal of the opposite party, and said access control section accesses a function for executing a communication content associated with said past message data and notifies said communication terminal of opposite party of said communication content associated with said past message data.

7. The communication terminal according to claim 6, wherein said message control section checks whether there is a first message data from said communication terminal of the opposite party, when there are a plurality of message data from said communication terminal of opposite party, said message control section respectively generates message memos of tag-form for said plurality of message data, and when any of said message memos displayed to be arrayed on a screen is selected, said message control section starts a communication with said communication terminal of the opposite party.

8. The communication terminal according to claim 6, wherein said message input section recognizes voice inputted to said input screen by using a microphone to convert a voice data into a text data, said message display section displays a content of said text data on said input screen, and said message control section transmits said text data and said voice data as said message data in response to an operation to said input screen, analyzes a message data from said communication terminal of opposite party to generate a message memo based on a text data of said message data, and reproduces a voice data of said message data in response to an operation to a play button displayed together with said message memo.

9. The communication terminal according to claim 6, wherein said message control section makes the communication with said communication terminal of the opposite party in response to the operation to said message memo, changes the status of said message data into a communicated state after said communication with said communication terminal of the opposite party when said communication with said communication terminal of the opposite party is made, deletes said message data and notifies said communication terminal of the opposite party that said message data is deleted when said communication with said communication terminal of the opposite party becomes unnecessary, and changes a status of said message data into a deleted state when receiving a notice that said message data is deleted from said communication terminal of the opposite party.

10. The communication terminal according to claim 6, wherein said message control section saves a path of a file and a URL which are used and accessed by at least one of a user and a application during a session of communication with said communication terminal of the opposite party such that said path and said URL are associated with said session, presents said path and said URL during the session of communication with said communication terminal of the opposite party, and reproduces an operation executed in a past session of communication with said communication terminal of the opposite party based on said path and said URL.

11. A message system controlling method for conducting message, comprising:

a first communication terminal on a sender side checking a connection state of a second communication terminal on a receiver side;

said first communication terminal displaying an input screen for generating a message data when said second communication terminal is in an offline state;

said first communication terminal generating the message data based on information inputted to said input screen;

said first communication terminal displaying a message memo based on said message data;

said first communication terminal checking said connection state of said second communication terminal in a predetermined interval until said second communication terminal becomes in an online state;

said first communication terminal transmitting said message data to said second communication terminal when said second communication terminal becomes in an online state;

said second communication terminal displaying said message memo based on said message data upon receiving said message data from said first communication terminal;

said second communication terminal changing a status of said message data in response to an operation to said message memo;

said second communication terminal transmitting a change notice of said status of said message data to said first communication terminal;

said second communication terminal changing a display form of said message memo such that a change of said status of said message data is visually recognizable;

said first communication terminal changing a status of said messaged data in response to a content of said change notice of said status of said message data;

said first communication terminal changing the display form of said message memo such that the change of said status of said message data is visually recognizable;

said first communication terminal associating an operation executed during the communication with said second communication terminal as a communication content with said message data;

said first communication terminal retrieving a past message data;

said first communication terminal accessing a function for executing a communication content associated with said past message data; and said first communication terminal notifying said second communication terminal of said communication content associated with said past message data.

12. The message system controlling method according to claim 11, further comprising:

said second communication terminal checking whether there is a first message data from said first communication terminal;

when there are a plurality of message data from said first communication terminal, said second communication terminal respectively generating message memos of tag-form for said plurality of message data and displays said message memos to be arrayed on a screen; and said second communication terminal starting the communication with said first communication terminal when any of said message memos displayed on said screen is selected.

13. The message system controlling method according to claim 11, further comprising:

said first communication terminal recognizing voice inputted to said input screen by using a microphone to convert a voice data into a text data said first communication terminal displaying a content of said text data on said input screen;

said first communication terminal transmitting said text data and said voice data as said message data in response to an operation to said input screen;

said second communication terminal analyzing said message data to generate a message memo based on said text data of said message data and said second communication terminal reproducing said voice data of said message data in response to an operation to a play button displayed together with said message memo.

14. The message system controlling method according to claim 11, further comprising:

said first communication terminal making the communication with said second communication terminal in response to the operation to said message memo;

said first communication terminal changing the status of said message data into a communicated state after said communication with said second communication terminal when said communication with said second communication terminal is made;

when said communication with said second communication terminal becomes unnecessary, said first communication terminal deleting said message data and notifying said second communication terminal that said message data is deleted; and when receiving a notice that said message data is deleted from said second communication terminal, said first communication terminal changing the status of said message data into a deleted state.

15. The message system controlling method according to claim 11, further comprising:

a server generating a unique folder based on a transmission date and time of said message data receiving said message data from at least one of said first communication terminal and said second communication terminal;

said server saving said message data in said folder to manage said message data collectively;

said server receiving a change notice of a status of said message data from at least one of said first communication terminal and said second communication terminal;

said server making a change of a status of said message data;

said server notifying another of said first communication terminal and said second communication terminal of said change; and said sever deleting said folder in which said message data is saved when said message data becomes unnecessary.

16. A non-transitory tangible computer program product that causes a communication terminal to execute a method comprising:

checking a connection state of a communication terminal of an opposite party, with which a communication is made;

displaying an input screen when said communication terminal of the opposite party is in an offline state;

generating a message data which stores a data of a message, a receiver data and a status data which are inputted to said input screen;

displaying a message memo based on said message data;

when said communication terminal of the opposite party is in an offline state, checking said connection state of said communication terminal of the opposite party in a predetermined interval until said communication terminal of opposite party becomes in an online state;

when said communication terminal of the opposite party becomes an online state, transmitting/receiving said messaged data with said communication terminal of the opposite party;

managing said message data to make a change of said status data based in a content of a change notice of a status of said message data from said communication terminal of the opposite party changing a display form of said message memo in response to said change of said status data;

detecting an operation to said message memo to execute a function for communicating with said communication terminal of the opposite party;

saving an operation executed during a communication with said communication terminal of the opposite party as a communication content such that said communication content is associated with said message data;

retrieving a past message data shared with said communication terminal of the opposite party based on a predetermined condition during a communication with said communication terminal of the opposite party;

accessing a function for executing a communication content associated with said past message data; and notifying said communication terminal of opposite party of said communication content associated with said past message data.

17. The non-transitory tangible computer program product according to claim 16, wherein the method further comprises:

checking there is a first message data from said communication terminal of opposite party;

when there are a plurality of message data from said communication terminal of opposite party, respectively generating message memos of tag-form for said plurality of message data to display said message memos to be arrayed on a screen; and when any of said message memos is selected, starting the communication with said communication terminal of the opposite party.

18. The non-transitory tangible computer program product according to claim 16, wherein the method further comprises:

recognizing voice inputted to said input screen by using a microphone to convert a voice data into a text data;

displaying a content of said text data on said input screen;

transmitting said text data and said voice data as said message data in response to the operation to said input screen;

analyzing the message data from said communication terminal of the opposite party to generate the message memo based on the text data of said message data; and reproducing the voice data of said message data in response to an operation to a play button displayed together with said message memo.

19. The non-transitory tangible computer program product according to claim 16, wherein the method further comprises:

making the communication with said communication terminal of the opposite party in response to the operation to said message memo;

when said communication with said communication terminal of the opposite party is made, changing the status of said message data into a communicated state after said communication with said communication terminal of the opposite party;

when said communication with said communication terminal of opposite party becomes unnecessary, deleting said message data and notifying said communication terminal of the opposite party that said message data is deleted; and when receiving a notice that said message data is deleted from said communication terminal of the opposite party, changing the status of said message data into a deleted state.

20. The message system controlling method according to claim 11, further comprising:

at least one of said first communication terminal and said second communication terminal saving a path of a file and a URL which are used and accessed by at least one of a user and a application during a session of communication with another of said first communication terminal and said second communication terminal such that said path and said URL are associated with said session; and at least one of said first commnunication terminal and said second communication terminal presenting said path and said URL during the session of communication with another of said first communication terminal and said second communication terminal to reproduce an operation executed in a past session of communication with another of said first communication terminal and said second communication terminal based on said path and said URL.

* * * * *